United States Patent [19]
Giordana

[11] 3,856,260
[45] Dec. 24, 1974

[54] THREE-WAY SOLENOID VALVES

[75] Inventor: Jean-Louis Giordano, Billancourt, France

[73] Assignees: Regie Nationale des Usines Renault, Billancourt; Automobiles Peugeot, Paris, both of, France

[22] Filed: Mar. 23, 1973

[21] Appl. No.: 344,208

[30] Foreign Application Priority Data
Mar. 31, 1972 France .............................. 72.11672

[52] U.S. Cl. ............................ 251/129, 137/625.65
[51] Int. Cl. ...................... F16k 11/10, F16k 31/06
[58] Field of Search .................. 137/625.65, 596.17; 251/129

[56] References Cited
UNITED STATES PATENTS
3,355,145  11/1967  Castelet ............................. 251/141
3,628,767  12/1971  Lombard ........................ 251/141 X

*Primary Examiner*—Arnold Rosenthal
*Attorney, Agent, or Firm*—Stevens, Davis, Miller & Mosher

[57] ABSTRACT

The ball-type three-way solenoid valve has coil wound on a yoke enclosing a fixed core tightened therein; a longitudinal passage formed in said core receives in a widened portion thereof a spring-loaded sliding valve member, the coil yoke and ball seat consisting of a single member moulded from suitable plastic material; this member comprises a metal insert for closing the magnet flux path through said ball and has formed therein a central longtudinal opening into which are introduced in succession a copper-coated ball, the coil compression spring with its valve member having a hexagonal cross-sectional contour, with its gasket, and the electromagnet core, the conducting coil being subsequently wound on said yoke, and sealing gaskets disposed at the longitudinal ends of the moulded member are eventually introduced; a shield of folded and pressed sheet metal encloses only partially said coil and is crimped on said moulded member and at the upper end of said core. (FIG. 3).

5 Claims, 4 Drawing Figures

PATENTED DEC 24 1974 3,856,260

THREE-WAY SOLENOID VALVES

The present invention relates to an improved ball-type three-way solenoid valve and has specific reference to known valves of the type as more particularly the valve disclosed in the U.S. Pat. No. 3,799,570.

This valve comprises an electromagnet enclosed in a casing, the fixed core of this electromagnet having a longitudinal axial passage formed therethrough and, at its base, truncated fins permitting the passage of the controlled fluid; in the base cone of these fins a ball bearing on an O-ring is disposed. In a widened end portion of the passage a cylindrical valve member is fitted and encloses a coil compression spring engaging the top of said ball.

This known solenoid valve type is attended by certain inconveniences due to the difficulty of machining and assembling its component within the desired tolerance limits. In fact, the permissible ball stroke between the O-ring and the electromagnet core is of the order of 0.8 mm. Now, considering a tolerance of ± 0.8 mm for each member determining the ball stroke, namely the core, the casing and the ball seat, a tolerance of the order of ± 0.3 mm, i.e., 0.5 mm in the minimum possibility and 1.1 mm in the maximum possibility, is obtained. The ball stroke may thus vary by more than 100 percent.

Now this is hardly acceptable for the proper operation of an electromagnet valve is limited by two well-defined factors:

1. if the permissible stroke of the ball valve between the core and the seat is too long, the magnetic pull of the electromagnet is too low;
2. if this stroke is too short, the air flow between the input port and the coaxial output port, or between this output port and a lateral output port will be detrimentally affected.

The optimum value of the ball stroke should therefore be maintained as much as possible (with a tolerance of the order of ± 0.1 mm).

It is the essential object of the present invention to provide a ball-type three-way electromagnet or solenoid valve so constructed that at least one fraction of the cumulative machining errors can be eliminated by allowing only one dimension to have any influence on said stroke.

This solenoid valve comprising an electromagnet having a coil wound on a yoke, a fixed core in which a longitudinal passage is formed, a spring-loaded valve member slidably fitted in said passage, a ball valve responsive to the electromagnetic pull produced by said electromagnet and a ball seat associated therewith, is characterised in that said coil yoke and ball seat are assembled into a single moulded member of suitable synthetic material, said member comprising a metal insert for closing the electromagnet magnetic flux through said ball valve, that said member is formed with a suitable central longitudinal opening into which are introduced in succession a surface copper-coated ball, a coil compression spring with a hexagonal-sectional valve member urged by said spring and a corresponding gasket, and the electromagnet core, the conducting coil being subsequently wound on said yoke, and sealing gaskets disposed at the longitudinal ends of said moulded member, a shield of folded and pressed sheet metal enclosing only partially said coil and being crimped on said moulded member.

A clearer understanding of the present invention will be had as the following description proceeds with reference to the accompanying drawing illustrating diagrammatically by way of example a typical form of embodiment of this invention. In the drawing.

Figure 1:
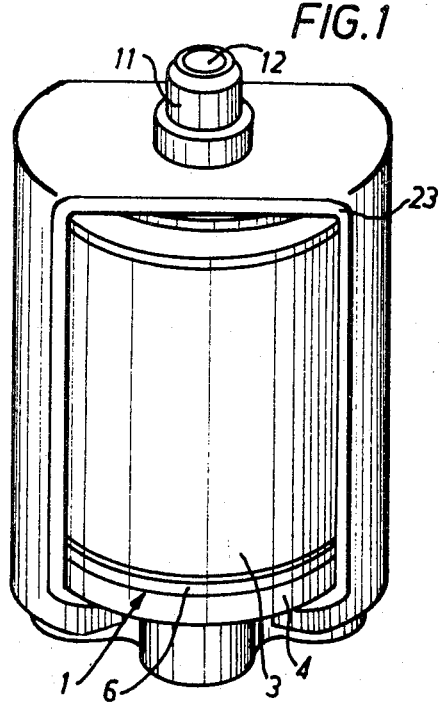
FIG. 1 is a perspective view of the solenoid valve.

Referring more in detail to the drawing, it will be seen that the solenoid valve according to this invention is obtained by moulding an integral piece 1 of suitable synthetic material comprising the yoke 2 of a solenoid coil 3 and the seat member 4 of a ball valve 5. This member, made from a material having good mechanical properties, has embedded in its lower, seat-forming portion a metal insert 6. A tapped nut-forming sleeve 7 is also embedded in the base portion of the seat to permit the fastening of the solenoid valve to a support by means of a screw.

Figure 2:
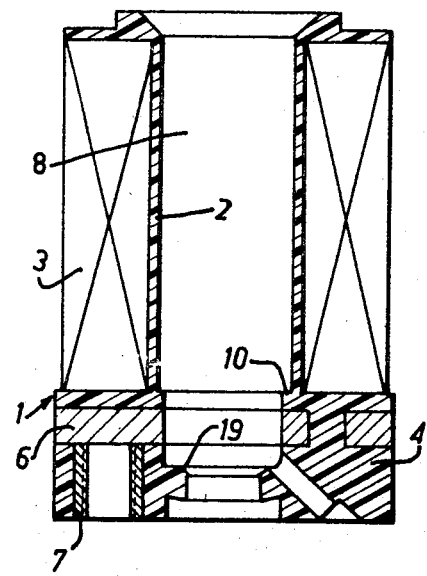
FIG. 2 illustrates in vertical axial section the integral moulded member comprising the coil yoke and the ball seat, with its metal insert.

A central passage 8 formed in the moulded member 1 permits the insertion from above of a core piece 9 down to a shoulder 10 of this passage 8 (FIGS. 2 and 3); the upper portion 11 of core 9 emerges from said member 1, and the core itself comprises a longitudinal inner passage 12 into which compressed air is adapted to be introduced from above.

A hexagonal-sectioned valve member 13 having an O-ring 14 fitted to its shoulder-forming upper end is a slide fit in a widened section 15 of passage 12, the O-ring engaging a frustoconical seat 16, thus improving the sealing action of this O-ring by wedge action. The hexagonal cross-sectional configuration of valve member 13 permits the flow of compressed air between the flat lateral faces of this member and the wall of the widened passage section 15. Thus, the truncated fins usually provided to this end in the prior art solenoid valves can be dispensed with, and therefore an additional machining operation likely to leave metal chips at a place to be left strictly clean is saved.

A coil compression spring 17 is disposed in the blind bore 18 of valve member 15; the lower end of this spring 17 reacts against the ball 5 bearing on an abutment 19 of seat member 4 and also on a central seal 20 formed with an axial hole 21. A second passage 22 opening into the chamber of ball valve 5 above said abutment 19 is formed obliquely through the base of seat member 4.

The external shield or armature 23 of the solenoid valve consists of a folded and/or pressed sheet metal element enclosing only partially the coil 3, thus facilitating the dissipation of the heat developing during the coil energization. This shield may be crimped if desired at its top, on the core 9 across a projection 24 formed in said core, and at its bottom on the seat member 4 at 25. The magnetic flux path is closed from core 9 to shield 23, through insert 6 and ball 5.

The fluid-tightness between the inner space of the solenoid valve and the surrounding atmosphere is obtained by using an O-ring 26 pressed between the upper portion of the coil yoke 2, the core 9 and the external shield 23, and also by using a rubber or plastic moulded seat 20 engaging the abutment 19.

In contrast with what is observed in solenoid valves of the hitherto known similar types, in a solenoid valve according to this invention it is not necessary to seal the shield assembly, since the shield itself does not contain any gas under pressure, so that the complete device is simplified considerably.

Figure 3:
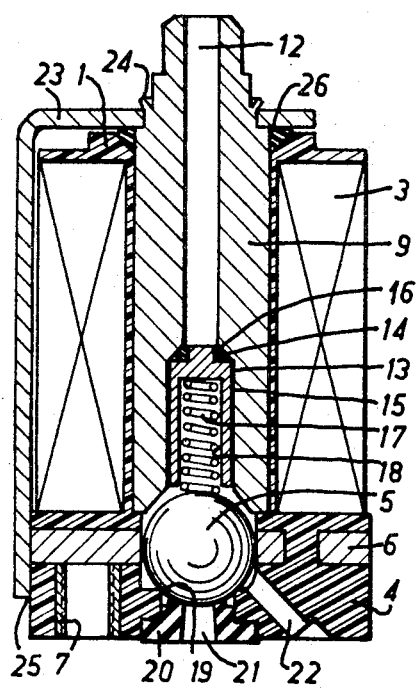
FIG. 3 illustrates in axial section the solenoid valve, the electromagnet coil being in its de-energized condition.

When the solenoid valve is inoperative, as shown in FIG. 3, the ball 5 engages its seat and closes the port 21, and the compressed air will unseat the valve member 13 so that it can flow from the passage 12 to the second port 22.

Figure 4:
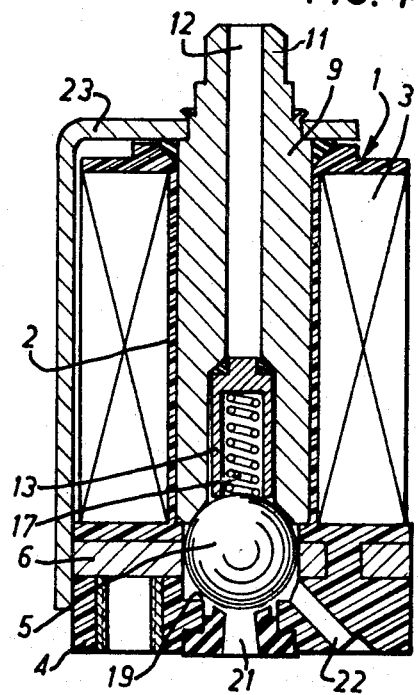
FIG. 4 illustrates the same solenoid valve with its coil energized.

When the solenoid valve coil is energized, the ball 5 is attracted towards the core 9 as illustrated in FIG. 4 and causes the ingress of passage 12 to be closed by the valve member 13 and its O-ring 14; thus, the compressed air cannot flow through the device, but a communication is established between the first port 21 and the second port 22, since the ball 5 has cleared this communication.

When moulding the member 1 of synthetic material, and more particularly the portion thereof extending from the operative face of abutment 19 to that of shoulder 10 with a precision of the order of $\pm 0.1$ mm, it will be seen that the accuracy thus obtained in the ball movements is about three times that observed in the above-mentioned prior art solenoid valves.

To assemble the components of the solenoid valve according to this invention, the moulded member 1 constituting the yoke of coil 2 and the seat of ball 5 receives in succession firstly the ball valve 5 (copper-coated to avoid magnetic remanence effects), then the coil spring 17 and the hexagonal-sectioned valve member 13 together with its O-ring or gasket 14; then the core 9 is driven into the passage 8 until abutes the shoulder 10. Subsequently, the coil 3 is wound and its pressure causes a certain shrinking of its yoke 2, so as to wedge the core 9 in position.

Finally, the lower seal 20 and upper seal 26 are fitted, and the external shield 23 is assembled and crimped.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What I claim is:

1. A ball-type three-way solenoid valve, comprising:

a. an electromagnet comprising a magnetic yoke,
   a magnetic core having a longitudinal axial passage therein, and,
   a coil yoke having a solenoid coil wound thereon;

b. a valve member slidably disposed in said magnetic core's passage;
 c. a valve seat for said valve member, disposed in said magnetic core's passage;
 d. a gasket disposed in engagement with said valve seat;
 e. a copper-coated ball movably responsive to the pulling effect of said electromagnet;
 f. a seat member for said ball;
 g. a compression spring interposed between said valve member and said ball;
 h. said coil yoke and said seat member being portions of a unitary synthetic material molded member having a longitudinal axial passage therein, said magnetic core inserted into said molded member's passage proximate said coil yoke portion and said ball inserted into said molded member's passage proximate said seat member portion, a shoulder disposed in said molded member's passage to abut said core and an abuttment disposed in said molded member's passage to support said ball when said electromagnet is de-energized;
 i. a pair of seals disposed in said molded member's passage, said first seal disposed at one end of said passage in said seat member portion, and said second seal disposed at the opposite end of said passage between said core and said coil yoke portion; and
 j. said magnetic yoke comprising a folded pressed sheet, steel shield partially enclosing said molded member proximate said coil.

2. The solenoid valve of claim 1 wherein said member has a metal insert embedded in said seat member portion.

3. The solenoid valve of claim 1 wherein said solenoid coil is tightly wound on said coil yoke portion, said yoke portion is shrunk on said magnetic coil to thereby wedge said core, and said shield is fitted over said shrunken yoke.

4. The solenoid valve of claim 1 wherein said shield is crimped on its ends on said molded member.

5. The solenoid valve of claim 1 wherein said valve member has a hexagonal cross-sectional configuration, said configuration permitting air flow in said core's passage.

* * * * *